United States Patent [19]

Ueno et al.

[11] Patent Number: 4,560,458

[45] Date of Patent: Dec. 24, 1985

[54] METHOD FOR IMPROVING SURFACE PROPERTIES OF A SHAPED ARTICLE OF A SYNTHETIC RESIN

[75] Inventors: Susumu Ueno; Hirokazu Nomura, both of Ibaraki, Japan

[73] Assignee: Shin-Etsu Chemical Co., Ltd., Tokyo, Japan

[21] Appl. No.: 690,380

[22] Filed: Jan. 10, 1985

Related U.S. Application Data

[63] Continuation of Ser. No. 575,505, Jan. 31, 1984, abandoned.

[30] Foreign Application Priority Data

Jan. 31, 1983 [JP] Japan .................................. 58-14460

[51] Int. Cl.$^4$ ............................................... C08J 7/12
[52] U.S. Cl. ..................................... 204/165; 204/168
[58] Field of Search ................................. 204/165, 168

[56] References Cited

U.S. PATENT DOCUMENTS

4,276,138  6/1981  Asai et al. ........................... 204/165
4,396,641  8/1983  Imada et al. ........................ 204/165

Primary Examiner—Howard S. Williams
Attorney, Agent, or Firm—Toren, McGeady, Stanger, Goldberg & Kiel

[57] ABSTRACT

Surface properties or, in particular, antistatic performance of a shaped article of a synthetic resin can be remarkably and lastingly improved by the exposure of the surface to low temperature plasma in two steps, in one of which the plasma is generated in an atmosphere containing a nitrogen-containing organic compound, e.g. amine, amide and the like compounds, and in the other of which the plasma is generated in an atmosphere containing a fluorine-containing organic compound, e.g. fluorinated hydrocarbon compounds. Alternatively, the plasma treatment is undertaken in one step with low temperature plasma generated in an atmosphere containing both of the nitrogen- and fluorine-containing organic compounds.

1 Claim, No Drawings

METHOD FOR IMPROVING SURFACE PROPERTIES OF A SHAPED ARTICLE OF A SYNTHETIC RESIN

This is a continuation of application Ser. No. 575,505, filed Jan. 31, 1984, now abandoned.

BACKGROUND OF THE INVENTION

The present invention relates to a method for improving surface properties of a shaped article of a synthetic resin. More particularly, the invention has an object to impart a shaped article of a synthetic resin with an improved antistatic performance with durability and permanency by the treatment of the surface with low temperature plasma.

Needless to say, shaped articles of synthetic resins are widely used in almost all fields of not only industrial but also in household uses by virtue of their advantages that they can be supplied with great inexpensiveness due to the easiness of their manufacturing and that they have various excellent properties including electric insulation. As a reflection of their high electric insulation, however, shaped articles of synthetic resins generally have a high surface resistivity with low dielectric loss so that troubles are often caused by the accumulation of static electricity on the surface. For example, beautifulness in the appearance of a synthetic resin shaped article is rapidly lost by the deposition of dusts and dirts on the surface as attracted by the static charge. Highly charged synthetic resin shaped articles sometimes cause an electric shock to human body coming into contact therewith or generate spark discharge which may influence electronic circuits to produce noises.

Several methods have been proposed to prevent accumulation of static electricity on the surface of a synthetic resin shaped article. The methods of antistatic treatment hitherto proposed include, for example, a method in which an electroconductive powdery material such as a metal powder and carbon black is incorporated into the synthetic resin prior to shaping of the resin into articles, a method in which a thin surface film of a metal is formed on the surface of the shaped article by sputtering, vacuum vapor deposition and the like techniques, a method using a surface active agent which is either incorporated into the resin prior to shaping or applied to the surface of the shaped article to form a coating film thereon, a method of the treatment of the surface with a chemical such as an acid or with a flame, a method in which hydrophilic functional groups are introduced on to the surface of the shaped article by the grafting reaction induced with actinic rays, e.g. electron beams, ultraviolet light and ionizing radiations, and others.

Unfortunately, none of the above mentioned prior art methods is sufficiently effective to impart antistatic performance to the surface of a synthetic resin shaped article or, if not ineffective at all, the properties of the synthetic resin is greatly degraded by the antistatic treatment or the method cannot be performed practically due to the expensiveness of the treatment or the inapplicability of the method for the mass treatment of a large quantities of the synthetic resin shaped articles.

SUMMARY OF THE INVENTION

It is therefore an object of the present invention to provide a novel and improved method for providing the surface of a shaped article of a synthetic resin with improved antistatic performance having durability and permanency by modifying the surface properties without affecting the excellent properties inherent to the bulk body of a synthetic resin shaped article.

The method of the present invention for improving the surface properties of a shaped article of a synthetic resin comprises treatment of the surface by the exposure to low temperature plasma in two steps, in one of which the surface is exposed to low temperature plasma generated in a gaseous atmosphere containing a nitrogen-containing organic compound and in the other of which the surface is exposed to low temperature plasma generated in a gaseous atmosphere containing a fluorine-containing organic compound or, alternatively, in one step to low temperature plasma generated in a gaseous atmosphere containing vapors of both of these two classes of organic compounds.

The above described inventive method is so effective that the surface of the synthetic resin shaped article is imparted with durable and permanent antistatic effect without the disadvantage of the decrease or degradation in the bulk properties of the synthetic resin shaped article such as the mechanical strengths.

DETAILED DESCRIPTION OF THE PREFERRED EMBODIMENTS

As is understood from the above description, the inventive method essentially comprises low temperature plasma treatment of the surface of a synthetic resin shaped article in two steps each with a different kind of organic compounds or in one step using a mixture of two kinds of the organic compounds. In one of the two steps of the low temperature plasma treatment, the surface of the shaped article is exposed to low temperature plasma generated in a gaseous atmosphere containing a nitrogen-containing organic compound. The nitrogen-containing organic compound suitable for the purpose may preferably be an amine compound of the general formula $R^1$—$NR^3$—$R^2$, an amide compound of the general formula $R^4$—CO—$NR^6$—$R^5$ or a diamine compound of the general formula $R^7$—$NR^{10}$—$R^8$—$NR^{11}$—$R^9$, in which $R^1$ and $R^7$ are each a substituted or unsubstituted monovalent hydrocarbon group, $R^2$, $R^3$, $R^4$, $R^5$, $R^6$, $R^9$, $R^{10}$ and $R^{11}$ are each a hydrogen atom or a substituted or unsubstituted monovalent hydrocarbon group and $R^8$ is a substituted or unsubstituted divalent hydrocarbon group.

Exemplary of the above defined amine, amide and diamine compounds are: methyl amine, dimethyl amine, trimethyl amine, ethyl amine, diethyl amine, triethyl amine, n-propyl amine, di-n-propyl amine, tri-n-propyl amine, n-butyl amine, n-amyl amine, n-hexyl amine, lauryl amine, ethylene diamine, trimethylene diamine, hexamethylene diamine, ethanolamine, diethanolamine, allyl amine, aniline, alanine, N-methyl aniline, allyl dimethyl amine, 2-aminoethyl ether, 1-dimethylamino-2-chloroethane, cyclopropyl amine, cyclohexyl amine, ethylene imine, 1-methyl ethyleneimine, N,N-dimethyl formamide, formamide, capronamide, aminoacetal, benzyl amine, piperiding, pyrrolidine, morpholine and the like as well as derivatives thereof. These nitrogen-containing organic compounds may be used in combination of two kinds or more according to need.

In the other of the two steps of the low temperature plasma treatment, the surface of the synthetic resin shaped article is exposed to low temperature plasma generated in a gaseous atmosphere containing a fluorine-containing organic compound in which the fluorine atom or atoms should be bonded directly to the carbon atom or atoms. The fluorine-containing organic compound should preferably be a partially fluorinated or perfluorinated hydrocarbon compound or a derivative thereof. Exemplary of such a fluorine-containing organic compound are: fluoromethane, difluoromethane, trifluoromethane, tetrafluoromethane, fluoroethane, difluoroethane, trifluoroethane, tetrafluoroethane, perfluoroethane, fluoropropane, fluorobutane, fluorooctane, fluorodecane, fluoroethylene, difluoroethylene, fluoropropylene, perfluoroethylene, trifluoromethyl acetylene, trifluorochloromethane, difluorochloromethane, difluorodichloromethane, fluorodichloromethane, fluorotrichloromethane, difluorodichloro-ethane, difluorochloroethane, fluorobenzene, difluorobenzene, trifluorobenzene, tetrafluorobenzene, hexafluorobenzene, fluorotoluene, fluoroxylene, ω-fluorotoluene, ω-difluorotoluene, benzotrifluoride, trifluoroacetic acid, trifluoroethyl amine, trifluoroethyl methyl ether, fluoronitrobenzene, fluoroaniline, fluorobenzene sulfonic acid, fluorophenol, fluorothiophenol and the like. These fluorine-containing organic compounds may be used either singly or as a combination of two kinds or more according to need. It is of course that the compound should have a vapor pressure sufficient to ensure introduction of the vapor into the gaseous atmosphere for the low temperature plasma generation.

The method of the present invention is applicable to shaped articles of almost all kinds of synthetic resins without particular limitations including, for example, polyethylene, polypropylene, polystyrene, saturated and unsaturated polyester resins, cellulose acetate, polysulfone, polycarbonate, polyurethane, polyimide, polyamide, i.e. nylons, polyamidoimide, polyvinyl alcohol, acrylic resins, methacrylic resins, polyacetal, polyvinyl chloride, copolymers of acrylonitrile and styrene, copolymers of acrylonitrile, styrene and butadiene, copolymers of ethylene and vinyl acetate, copolymers of vinylidene chloride and vinyl chloride, urea resins, melamine resins, silicone resins, polyphenylene oxide, poly-p-xylene, polyphenol, epoxy resins, diallyl phthalate resins and the like. The synthetic resin may be in the form of a block copolymer or a graft copolymer and polymer blends of the above named synthetic resins are also included.

The above named synthetic resins can be admixed with various kinds of additives and processing aids conventionally used in the fabrication of synthetic resin articles including, for example, plasticizers, stabilizers, lubricants, fillers, extenders, pigments, dyes, heat-resistance improvers, flame retardants, antioxidants, ultraviolet absorbers, surface active agents, crosslinking agents, antifogging agents, dehumidifiers, elasticity improvers and the like.

The method for shaping of the shaped articles to be treated according to the inventive method is not particularly limitative and any conventional polymer shaping methods are applicable including casting, extrusion molding, injection molding, calendering, drawing, compression molding and others. The form of the shaped article is also not particularly limitative provided that the uniformity of the effect of the plasma treatment is ensured allover the surface where improvement in the antistatic performance is desired. Further, these shaped articles may have been subjected to a secondary treatment according to need such as a heat treatment, drawing or stretching, shrinking, crosslinking, sand blasting, corona discharge treatment, treatment with a solvent, treatment with ionizing radiations and the like, by which the effectiveness of the inventive method is little affected.

The scope of the inventive method is to impart the surface of the above described shaped article of a synthetic resin with improved antistatic performance having durability and permanency by the modification of the surface properties thereof by the two step treatment with low temperature plasma each with a different kind of the plasma-supporting gases or in a one-step treatment with low temperature plasma generated in an atmosphere containing both of them. When the two-step procedure is undertaken, the low temperature plasma treatment in either step is carried out basically in a procedure that the shaped article of the synthetic resin is introduced into a chamber for generating low temperature plasma therein, the pressure inside the chamber is controlled at 10 Torr or below by passing therethrough a gas of either one or more of the above described nitrogen-containing organic compounds or the fluorine-containing organic compounds, low temperature plasma is generated in the chamber kept under the reduced pressure to expose the surface of the shaped article to the low temperature plasma, the gas of the plasma atmosphere is then replaced with a gas of the other class which is passed through the plasma chamber to control and keep the pressure inside the chamber also at 10 Torr or below and low temperature plasma is again generated in the atmosphere of this second plasma gas at a low pressure to expose the surface of the shaped article to this second low temperature plasma. It is preferable that the low temperature plasma treatment is performed first with the nitrogen-containing organic compound as the plasma gas followed by the treatment with the fluorine-containing organic compound.

When the plasma treatment is carried out in one step by use of a gaseous mixture of the nitrogen-containing and fluorine-containing organic compounds, alternatively, these two kinds of gases or vapors are introduced into the plasma chamber as mixed together in advance in a suitable mixing ratio or separately but simultaneously into the chamber in a suitable proportion of flow rates. The mixing ratio or the ratio of the flow rates of the nitrogen-containing organic compound to the fluorine-containing organic compound is preferably in the range from 10:1 to 1:10 by volume.

A further alternative method is that the low temperature plasma treatment is first carried out under a gas flow of the vapor of either one class of the compounds and the composition of the flowing gas is gradually changed by admixing an increasing volume of the vapor of the compound of the other class so that the first plasma-supporting gas is gradually and continuously replaced with this second plasma-supporting gas to finally constituting the plasma atmosphere with the vapor of the second compound alone.

It is of course optional in carrying out the plasma treatment according to the invention that the vapor or vapors of the nitrogen-containing organic compound and/or the fluorine-containing organic compound are diluted with other kinds of gases including inorganic gases such as inert gases, e.g. helium and argon, nitrogen, oxygen, air, hydrogen, water vapor, carbon monoxide, carbon dioxide and the like and organic gases other than those containing nitrogen or fluorine atoms. When an inorganic gas is admixed with the vapor or vapors of the nitrogen- or fluorine-containing organic compounds, it is preferable that the nitrogen- or fluorine-containing organic compound has a partial pressure of $10^{-3}$ to 10 Torr while the inorganic gas has a partial pressure of $10^{-4}$ to 10 Torr.

According to the above described method of the invention, the plasma-treated synthetic resin article is imparted not only with lastingly improved antistatic performance or decreased surface resistivity but also with improved wettability, printability and susceptibility to adhesive bonding.

In the above described method of the plasma treatment, the pressure of the plasma atmosphere inside the plasma chamber should be 10 Torr or below or, preferably, in the range from 0.005 to 1 Torr because no sufficient effect of the plasma treatment is obtained in an atmosphere of a pressure higher than 10 Torr. That is, the antistatic performance of the plasma-treated surface rapidly decreases with increase of the surface resistivity as the pressure of the plasma atmosphere increases over 10 Torr. Such an influence of the gaseous pressure has been quite out of expectation from the knowledges in the conventional plasma polymerization and plasma treatment.

In connection with the electric conditions, the electric power supply to the electrodes may be 10 watts to 100 kilowatts at a frequency of 10 kHz to 100 MHz. The type of the electrodes is not particularly limitative although an apparatus of the so-called interior electrode-type is preferred. Apparatuses of the exterior electrode-type and an apparatus having a single high frequency work coil surrounding the plasma chamber are also usable according to need. The type of the electric discharge may be glow discharge or corona discharge and sufficient effects can be obtained in either type of the discharge. The duration of the low temperature plasma treatment should be determined naturally in consideration of the electric power and other parameters although satisfactory results can be obtained usually by the treatment for a few seconds to several tens of minutes.

In the following, examples are given to illustrate the method of the present invention in more detail showing the results obtained in some experiments, in which the effectiveness of the treatment were evaluated by the measurements of the distance of cigarette ash attraction toward the surface of the article rubbed to induce static electricity, surface resistivity and static voltage on the surface of the rubbed article. The conditions for these measurements were as follows.

Distance of cigarette ash attraction: the surface of the article under test was rubbed 10 times with a cotton cloth at 25° C. in an atmosphere of 60% relative humidity and the thus rubbed and electrically charged surface was slowly brought toward a pile of cigarette ash to determine the distance between them at which the attraction of the ash on to the charged surface first took place.

Surface resistivity: measurements were made by use of an instrument Model SM-10 manufactured by Toa Denpa Kogyo Co. at 25° C. in an atmosphere of 60% relative humidity.

Charge voltage induced by rubbing: mesurements were made by use of a rotary static tester manufactured by Koa Shokai Co. using a cotton cloth under a load of 200 g driven at 750 r.p.m. for 1 minute at 25° C. in an atmosphere of 60% relative humidity.

EXAMPLE 1

A commercially available film of a flexible type polyvinyl chloride resin containing 40 phr of a plasticizer was treated with low temperature plasma in two steps. Thus the film was placed inside the plasma chamber of a low temperature plasma apparatus and the chamber was evacuated to a pressure of $10^{-3}$ Torr followed by the continuous introduction of methyl amine gas at a constant rate so that the pressure inside the chamber was controlled and maintained at 0.2 Torr by the balance of the continuous evacuation and introduction of the gas. While keeping the atmospheric conditions as above, a high frequency electric power of 3 kilowatts at a frequency of 110 kHz was supplied to the electrodes to generate low temperature plasma in the plasma chamber to which the surface of the resin film was exposed for 30 seconds. Following the above described first step of the plasma treatment, the chamber was again evacuated to a pressure of $10^{-3}$ Torr followed by the continuous introduction of difluorochloromethane gas at such a constant rate that the pressure inside the chamber was controlled and maintained at 0.1 Torr and the second-step low temperature plasma treatment of the film was performed by supplying a high frequency electric power of 1 kilowatt at 110 kHz to generate low temperature plasma for 3 minutes. The thus obtained resin film plasma-treated in two steps is referred to as Sample No. 1.

In the second run of the plasma treatment, the same resin film was treated in one step with low temperature plasma generated in the methyl amine atmosphere under the same conditions as above up to the end of the first step. This resin film is referred to as Sample No. 2 hereinbelow.

In the third run of the plasma treatment, the first step of the treatment, i.e. the plasma treatment with methyl amine plasma, in the first run was omitted and the second step plasma treatment alone was undertaken with the same resin film under the same conditions as in the second step of the difluorochloromethane plasma treatment of the first run. The thus obtained resin film is referred to as Sample No. 3 hereinbelow.

The above prepared Samples No. 1 to No. 3 as well as the same resin film before the plasma treatment, which is referred to as Sample No. 4 hereinbelow, were each subjected to the measurements of the distance of cigarette ash attraction, surface resistivity and charge voltage by rubbing. These measurements were undertaken immediately after the plasma treatment and after dipping in water at 90° C. for 7 days to give the results shown in the Table below.

TABLE

| Sample No. | Distance of cigarette ash attraction, cm | | Surface resistivity, ohm | | Charge voltage by rubbing, volts | |
|---|---|---|---|---|---|---|
| | As plasma-treated | After dipping in water | As plasma-treated | After dipping in water | As plasma-treated | After dipping in water |
| 1 | 0 | 0 | $2 \times 10^8$ | $6 \times 10^8$ | 150 | 300 |
| 2 | 0 | 5 | $7 \times 10^8$ | $1 \times 10^{13}$ | 190 | 3600 |
| 3 | 6 | 6 | $8 \times 10^{14}$ | $8 \times 10^{14}$ | 5200 | 5600 |
| 4 | 5 | 5 | $3 \times 10^{13}$ | $7 \times 10^{14}$ | 2500 | 4100 |
| 5 | 0 | 0 | $4 \times 10^8$ | $9 \times 10^8$ | 200 | 270 |
| 6 | 0 | 0 | $4 \times 10^8$ | $1 \times 10^9$ | 210 | 310 |
| 7 | 0 | 4 | $5 \times 10^8$ | $9 \times 10^{11}$ | 230 | 1950 |
| 8 | 6 | 6 | $1 \times 10^{15}$ | $1 \times 10^{15}$ | 6600 | 6400 |
| 9 | 4 | 4 | $5 \times 10^{12}$ | $4 \times 10^{12}$ | 2100 | 2500 |

TABLE-continued

| Sample No. | Distance of cigarette ash attraction, cm | | Surface resistivity, ohm | | Charge voltage by rubbing, volts | |
|---|---|---|---|---|---|---|
| | As plasma-treated | After dipping in water | As plasma-treated | After dipping in water | As plasma-treated | After dipping in water |
| 10 | 0 | 0 | $2 \times 10^8$ | $1 \times 10^9$ | 170 | 250 |
| 11 | 0 | 0 | $1 \times 10^9$ | $8 \times 10^9$ | 310 | 450 |
| 12 | 0 | 0 | $7 \times 10^8$ | $4 \times 10^9$ | 280 | 370 |
| 13 | 6 | 6 | $6 \times 10^{15}$ | $6 \times 10^{15}$ | 6200 | 6500 |

EXAMPLE 2

The same resin film as used in Example 1 was subjected to a one-step low temperature plasma treatment in an atmosphere containing both of the vapors of the nitrogen- and fluorine-containing organic compounds. Thus, the resin film was placed in the plasma chamber and the chamber was evacuated to a pressure of $10^{-3}$ Torr followed by the continuous introduction of atmospheric air so that the pressure inside the chamber was controlled and maintained at 0.05 Torr. Thereafter, a 2:1 by volume gaseous mixture of methyl amine and 1,1-difluoroethylene was introduced into the chamber at a constant rate to be admixed with the air already under flowing through the plasma chamber and to give an overall pressure of 0.3 Torr. A high frequency electric power of 500 watts at a frequency of 13.56 MHz was supplied to the electrodes for 5 minutes to generate low temperature plasma inside the plasma chamber to which the surface of the resin film was exposed. The thus plasma-treated resin film, which is referred to as Sample No. 5 hereinbelow, was subjected to the evaluation of the surface properties to give the results shown in the Table.

EXAMPLE 3

A commercially available polyethylene terephthalate film was subjected to low temperature plasma treatment in 3 runs, in the first of which the resin film was placed in the plasma chamber and the chamber was evacuated to a pressure of $10^{-3}$ Torr followed by the continuous introduction of a 1:1 by volume gaseous mixture of formamide and trifluoromethane at a constant rate to give a pressure of 0.5 Torr inside the plasma chamber. While keeping the atmospheric conditions as above inside the plasma chamber, a high frequency electric power of 5 kilowatts at a frequency of 110 kHz was supplied to the electrodes to generate low temperature plasma to which the resin film was exposed for 30 seconds. The thus plasma-treated resin film is referred to as Sample No. 6 hereinbelow.

In the second run of the plasma treatment, the gaseous mixture of formamide and trifluoromethane was replaced with pure formamide gas, the other conditions being the same as in the first run. The thus plasma-treated resin film is referred to as Sample No. 7 hereinbelow.

Further in the third run of the plasma treatment, the gaseous mixture of formamide and trifluoromethane was replaced with pure trifluoromehane gas, the other conditions being the same as in the first run. The thus plasma-treated resin film is referred to as Sample No. 8 hereinbelow.

Each of the Samples No. 6 to No. 8 was subjected to the evaluation of the surface properties to give the results shown in the Table together with the results obtained with the same resin film before the plasma treatment, which is referred to as Sample No. 9 in the table.

EXAMPLE 4.

The same resin film as used in Example 3 was placed in the plasma chamber and the chamber was evacuated to a pressure of $10^{-3}$ Torr followed by the continuous introduction of allylamine gas at such a rate that the pressure inside the plasma chamber was controlled and maintained at 0.05 Torr. While keeping the atmospheric conditions inside the chamber as above, a high frequency electric power of 500 watts at a frequency of 13.56 MHz was supplied to the electrodes to generate low temperature plasma inside the chamber, to which the resin film was exposed for 1 minute.

After completion of the above described first step of the plasma treatment, the introduction of the allylamine gas was interrupted and the chamber was again evacuated to a pressure of $10^{-3}$ Torr followed by the introduction of nitrogen gas at such a rate that the pressure inside the chamber was controlled and maintained at 0.05 Torr and then by the additional introduction of trifluoromethane gas which was mixed with the nitrogen gas to give an overall pressure of 0.1 Torr inside the chamber. While keeping the atmospheric conditions inside the chamber as above, low temperature plasma was generated in the same electric conditions as in the first step, to which the resin film was exposed for 30 seconds.

The resin film thus plasma-treated in two steps, which is referred to as Sample No. 10, was subjected to the evaluation of the surface properties to give the results shown in the Table.

EXAMPLE 5

A sheet of polytetrafluoroethylene obtained on the market was placed in the plasma chamber and the chamber was evacuated to a pressure of $10^{-3}$ Torr followed by the continuous introduction of argon gas at such a rate that the pressure inside the chamber was controlled and maintained at 0.1 Torr and then by the additional introduction of dimethylamine gas to be admixed with the argon gas giving an overall pressure of 0.5 Torr inside the chamber. While keeping the atmospheric conditions inside the chamber as above, a high frequency electric power of 5 kilowatts at 110 kHz was supplied to the electrodes to which the resin sheet was exposed for 1 minute.

After completion of the above described first step treatment, the introduction of the argon and dimethylamine gases was interrupted and the chamber was again evacuated to give a pressure of $10^{-3}$ Torr followed by the introduction of difluorochloromethane gas at such a rate that the pressure inside the chamber was controlled and maintained at 0.5 Torr. Low temperature plasma was generated under the same electric conditions as in the above first step treatment while keeping the atmospheric conditions as above and the resin sheet was exposed to the plasma for 30 seconds. The resin sheet thus plasma-treated in two steps is referred to as Sample No. 12 hereinbelow.

In the next run, the same resin sheet was placed in the plasma chamber and the chamber was evacuated to give a pressure of $10^{-3}$ Torr followed by the introduction of ethylamine gas at such a rate that the pressure inside the plasma chamber was controlled and maintained at 0.2 Torr and low temperature plasma was generated by supplying a high frequency electric power of 200 watts at a frequency of 13.56 MHz to the electrodes, to which the resin sheet was exposed for 5 minutes.

The resin sheet was then taken out of the plasma chamber and kept at 50° C. for 24 hours under atmospheric air and thereafter again placed in the plasma chamber. The chamber was evacuated to give a pressure of $10^{-3}$ Torr followed by the introduction of nitrogen gas at such a rate that the pressure inside the chamber was controlled and maintained at 0.05 Torr and then by the additional introduction of a gas of 1,1,-difluoro-1-chloroethane to be admixed wih the nitrogen gas already under flowing and to give an overall pressure of 0.5 Torr inside the chamber. While keeping the atmospheric conditions inside the chamber as above, a high frequency electric power of 300 watts at a frequency of 13.56 MHz to generate low temperature plasma to which the resin sheet was exposed for 3 minutes. The resin sheet thus plasma-treated in two steps is referred to as Sample No. 12.

The Samples No. 11 and No. 12 as well as the same resin sheet before the plasma treatment, which is referred to as Sample No. 13, were subjected to the evaluation of the surface properties to give the results shown in the Table.

What is claimed is:

1. A method for improving the surface properties of a shaped article of a synthetic resin comprising the sequential steps of:
   (a) exposing the surface of the shaped article to low temperature plasma generated in an atmosphere containing a nitrogen-containing organic compound; and then
   (b) exposing the surface of the shaped article treated in step (a) to low temperature plasma generated in an atmosphere containing a fluorine-containing organic compound.

* * * * *